Oct. 18, 1949.　　　　A. M. TIMPE　　　　2,485,420
SHUTTLECOCK
Filed Oct. 14, 1946
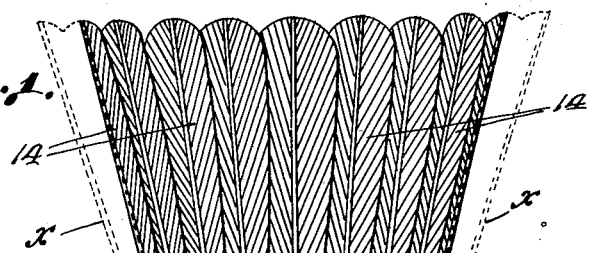
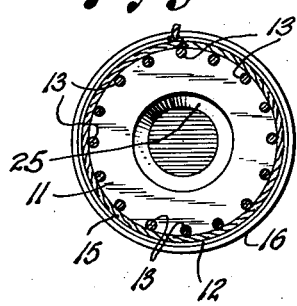
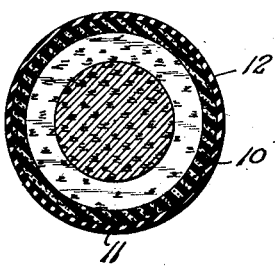
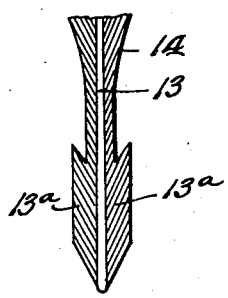
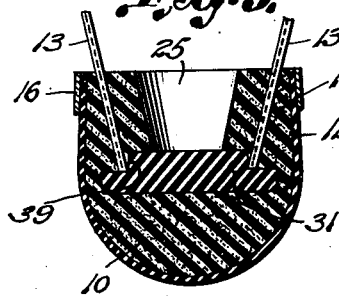
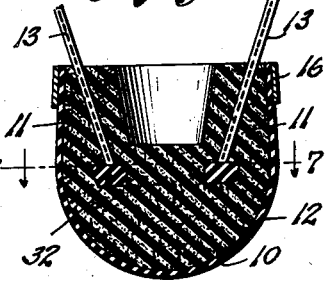
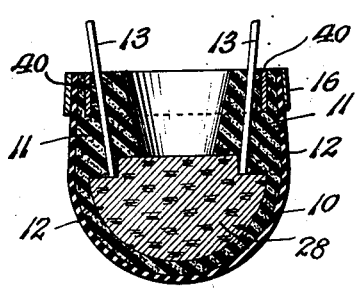
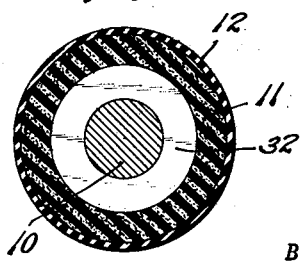
INVENTOR.
Atwood M. Timpe
BY Percy H. Moore
ATTORNEY.

Patented Oct. 18, 1949

2,485,420

UNITED STATES PATENT OFFICE 2,485,420

SHUTTLECOCK

Atwood M. Timpé, Los Angeles, Calif.

Application October 14, 1946, Serial No. 703,158

9 Claims. (Cl. 273—106)

1

This invention relates to a shuttlecock generally termed a bird and used in the games of badminton, battledore, shuttlecock and the like, wherein the so-called bird is struck by rackets manipulated by the contending players of the game.

The present invention constitutes an improvement over my prior Patent No. 2,217,032, dated October 8, 1940, wherein I have disclosed a form of shuttlecock the cup-shaped base or body of which is composed of sponge rubber. However, while my prior invention possessed many advantages it was found that due to the extreme flexibility of the base, it allowed the cone, which consists of feathers, to open up to such a degree, when the bird is hit with a hard smash for what is known as a finish shot, that the bird is caused to slow up at the end of its flight thus giving an opponent too much time to retrieve the bird before it hit the floor.

One of the principal objects of the present invention is to overcome the foregoing objection without losing any of the advantages obtained from the use of a sponge rubber base.

Other objects and advantages of my invention will be apparent as the specification is considered with the accompanying drawing, wherein:

Figure 1 is a vertical section taken through the center of a shuttlecock or bird constructed in accordance with my invention;

Figure 2 is a horizontal section taken on the line 2—2 of Figure 1;

Figure 3 is a horizontal section taken on the line 3—3 of Figure 1;

Figure 4 is a fragmentary elevational view of one of the feathers utilized in the construction of the bird;

Figure 5 is a sectional view of a modified form of the invention;

Figure 6 is a sectional view of a still further modified form of the invention;

Figure 7 is a horizontal section taken on the line 7—7 of Figure 6; and

Figure 8 is a vertical sectional fragmentary view of a still further modified form of the invention.

Referring more particularly to the drawing, 10 designates a substantially hemi-spherical base or body of pure gum sponge rubber and, formed integral with the marginal portion of said body

2 is a circular wall 11 also formed from sponge rubber. In order to give the body of the bird a finished and attractive appearance, I prefer to encase said body including the wall 11 with an integral thin "skin" or layer 12 of pure gum rubber.

Thus the elastic body of the bird has the general shape of a cup with a rounded forward or lower end. Embedded in the wall 11 are the ends of the quill portions 13 of the feathers 14 forming a part of the bird. These feathers are cut from the extreme upper portions of natural feathers that are from ten to twelve inches long in order to obtain maximum flexibility of the feather with minimum weight and thus, I am able to produce a bird having a greater degree of weight in the body thereof.

I prefer to cut the feathers so that the same have an approximate length of two and seven-eighths inches over-all, as such construction enables a substantial portion of the quill to be inserted in the wall 11, and from the top or rear face of the wall 11 the quill with the feather portions thereof cut away extends rearwardly or upwardly for approximately seven-eighths of an inch.

Those portions of the quills of the feathers that are inserted in the wall 11 extend downwardly and inwardly into the body 10 of the bird approximately an eighth or a quarter of an inch below or beyond the bottom of the recess or chamber 25 that is surrounded by the wall 11.

The portions 14 of the feathers are preferably formed so that they are of elongated oval or almond shape and, when the forwardly and inwardly inclined ends of the quill portions of said feathers are inserted in the wall 11 the feather portions 14 are disposed so that they overlap each other, thereby forming a substantially circular wall that gradually increases in diameter towards its outer or rear end.

Due to the particular shape of the portions 14 of the feathers and the arrangement of such portions when said feathers are applied to the body of the bird, the spin of the bird after being struck and while in flight is not affected and further, there is no quivering of the bird during flight.

In cutting and giving shape to the feathers that are used in the bird, the barbs on that portion of the quill that is embedded in the wall 11 and body 10 are shaped so that they project slight distances from the quill thus forming oppositely disposed short rows of barb portions 13a which, when embedded in the wall and body and secured thereto by cement or other adhesive, effectually anchors the feathers to the body and resists to a substantial degree strains and stresses that tend to pull the embedded portions of the feathers out of the body and wall.

In order to firmly secure the feathers to the elastic body of the bird, the ends of the quill portions 13 and barbs 13a thereon are, before being inserted into the body, coated with a suitable cement or adhesive and, to further secure the feathers to the body and to maintain the projecting portions of the feathers in proper relation, a thread 15 preferably of linen surrounds the quill portions of the feathers immediately adjacent the flat surface at the top or rear end of wall 11 and this thread is secured to the quill portions of the feathers and to the flat surface of the wall by cement or other adhesive. In some instances the barbs 13a may be omitted.

In applying the tie 15 to the feathers, I prefer to wrap said tie twice around the circular row of feathers before securing its ends to each other, and, during such operation the tie is drawn taut so as to slightly contract the size of the circle occupied by the row of feathers and, such action necessarily contracts to a certain degree the circumference of the wall 11, thereby putting the elastic material in said wall under compression and such action reduces the circumference of the circle occupied by the outer ends of the feathers.

In Fig. 1 dotted lines x indicate the position of the feathers before the tie has been applied and drawn taut as just described and, solid lines show the position of the feathers after the tying operation has been completed and the bird is ready for use.

This development of tension in the wall portion of the body materially increases the resiliency of the bird and imparts thereto the very desirable attribute of "speed" in play, due to the fact that the bird tends to return to its normal position more quickly than where a substantial portion of the sponge rubber body is not under constant tension due to the compression afforded by the tie.

The location of the thread 15 directly against the upper or rear flat face of the wall 11, locates the weight of said thread as near as possible to the center of gravity of the elastic body of the bird and, said thread in such position, does not offer any resistance to the air during the flight of the bird and which condition would exist if the thread were positioned on the quill portion of the feathers a short distance away from the end of the wall 11 of the body.

In order to obtain the desired degree of compression imparted to the upper portion of the wall 11 of the body, a narrow strip of thin flexible material 16, preferably fabric, such as a narrow ribbon or strip of silk, is secured to the outer face of the upper portion of the wall 11 after the same has been compressed, said thin, narrow strip being permanently secured to the wall of the body by the adhesive, such as cement.

After the tie 15 has been applied and secured around the feathers immediately adjacent the top of the wall of the body, the latter is dipped in rubber cement having a pure white pigment, in order that said cement may coat the entire surface of the body 10 and the circumferential surface of the wall 11. After the cement has partially dried and become "tacky," the narrow, flexible strip of fabric 16 is applied to the outer upper face of the wall 11, with the ends of said strip overlapping approximately one-half inch. In applying the fabric strip, it is pulled tight upon the wall, but it should not increase the compression of the rubber in the wall beyond that degree produced by the application and fastening of the tie 15.

While the cement coating on the wall and body are still tacky, a pure white dusting powder is applied to said cement coated surface and, when the cement has become thoroughly dried the body of the bird is given a pure white color which adds materially to the appearance thereof. In order to increase the appearance of the bird, the fabric strip 16 that is secured to the upper outer portion of the wall by the rubber cement may be distinctively colored, for instance, red, blue, green, or the like.

An especially desirable feature of my invention is, that the over-all length of the feather is less that that of the feathers used in the standard forms of birds now produced and on the market and, I have found by tests and experiments that this shortening of the feathers is effective in producing a stiffer cone of feathers without the necessity for stitching or tying the feathers to each other at a point above or to the rear of the body of the bird. By eliminating this stitching or tie, it is possible to produce a bird that will weigh approximately ten grains more than the conventional bird and this added weight is an advantage, due to the fact that the flight of the bird after being struck will be truer on account of its increased weight.

The reason that my improved bird does not travel farther than the standard bird in spite of the added weight, is due to the fact that when the bird receives a hard blow, the resulting added spin causes the cone of feathers to expand, thus stopping the bird within the boundary lines of the court on which the game is played.

However, practice has proven that due to the extreme flexibility of the base so far described, it allowed the cone of feathers to open to such a degree, under extreme playing conditions, that the bird, at the end of its flight, travels so slowly as to give an opponent too much time in which to retrieve the bird before it hits the floor. In order to definitely limit this opening or spreading action of the feathers, without sacrificing any of the advantages flowing from the use of a sponge rubber base, I propose to reinforce or stiffen that portion of the base adjacent to the lower or forward end of chamber 25. Thus the base is provided with a reinforcing or stiffening member 28 to which the ends of the quill portions 13 are attached, as by frictional engagement or by means of a suitable cement or adhesive.

In the preferred form of my invention, illustrated in Figure 1, the member 28, which is of semi-spherical shape and preferably of cork or hard rubber but may be of any suitable material of desired weight and resistance, having less flexibility than sponge rubber 10, is suitably coated with cement and embedded in the soft rubber base 10, in the course of manufacturing operations. The flat rear face 29 of the member 28 is preferably arranged flush with or slightly below the bottom of chamber 25, but in some instances may project slightly into the chamber 25. And, when the stiffening member extends slightly into or is flush with the bottom of chamber 25, the face 29 will constitute the bottom wall of the chamber and where the stiffening member 28 is arranged below the chamber 25, the former will of course be completely embedded in the soft rubber of which the body or base is made.

The flat face 29 of member 28 is peripherally recessed to provide a shoulder 39 against which the ends of the forwardly and inwardly inclined quills rest thus preventing inward closing movement of the quills. Consequently it will be seen that when the cone wants to open the quill end of the feathers will be pressed against the shoulder 39 of the stiffening member only allowing the cone to open up just the distance of the amount of sponge rubber which surrounds the feathers at the top of the base. The member 28 also assists the operator in building the bird in that it serves as a stop to prevent pushing the quills too far into the base and thus causing an irregular condition at the top of the cone.

Figure 5 shows a slightly modified form of stiffening member 31, quite similar in shape to member 28 except that the forward curved end of the latter is eliminated. The depth or thickness of the member 31 is thus materially reduced thereby adding more life and rebound in the nose of the bird.

Figure 6 discloses a still further modification in which a stiffening member 32 in the form of a flat apertured disk is employed. In this form of the invention inward or closing movement of the inner ends of the quills is resisted by the frictional engagement of the quills with the stiffening member 32. This resistance is increased by reason of the fact that these parts are cemented to each other. The use of member 32 imparts even greater life and rebound in the nose of the bird than attained by the use of member 31. It will also be noted that member 32 serves as a stop member for limiting the extent to which the quills can be inserted in the case, in the same manner as member 28 and 31.

In Figure 8 I have disclosed a still further modification of my invention wherein the cord or tie 15 is eliminated. However, in lieu of the member 15 I employ a narrow flexible endless band 40 of porous fabric, somewhat similar to the strip 16, previously described. This band 40 is embedded in the wall 11 during molding operations so that it will lie between and in slightly spaced relation with respect to the strip 16 and the quill portions 13 of the feathers. This reduces the amount of rubber between these parts thus reducing the outward motion of the feathers and reducing the liability of quill breakage. At the same time the small amount of rubber between the quill ends 13 and the band 40 prevents any direct shock at this point.

Thus it will be seen that I have provided a shuttlecock or bird that is relatively simple in construction, inexpensive of manufacture and very effective in performing the functions for which it is intended.

It will be understood that minor changes in the size, form and construction of the various parts of my improved shuttlecock, may be made and substituted for those herein shown and described, without departing from the spirit of my invention, the scope of which is set forth in the appended claims.

Having thus described my invention, what I claim is:

1. A shuttlecock comprising a substantially hemispherical body of elastic material, an elastic wall formed integral with said body opposite its rounded face, a circular row of feathers having the ends of their quill portions inserted in said elastic wall, a flexible tie surrounding the quill portions of said feathers immediately adjacent the end of said wall and which tie is secured to said wall, a stiffening member in said base formed of stiffer material than the material of which said elastic wall is formed and engaging the ends of said quill portions for resisting inward closing movement thereof.

2. A shuttlecock comprising a substantially hemi-spherical body of elastic material, an elastic circular wall formed integral with said body opposite its rounded face, a stiffening member embedded in said base, a circular row of feathers having the ends of their quill portions inserted and embedded in said wall and the extreme ends of the quills engaging said member whereby inward or closing movement of said ends is resisted.

3. A shuttlecock comprising a substantially hemi-spherical body of sponge rubber, a circular wall of sponge rubber formed integral with said hemi-spherical body of rubber opposite its rounded face and a series of feathers having the ends of their quill portions embedded in said wall and extending a substantial distance beyond said wall into said hemi-spherical body of sponge rubber and stiffening means in said body of less flexibility than sponge rubber engaged by the ends of said quill portions.

4. A shuttlecock comprising a substantially cup-shaped body formed of sponge rubber and having a chamber therein, a plurality of feathers having their quill ends embedded in said body around the chamber therein, barbs on the embedded end portions of said feathers and a stiffening member embedded in said body engaged by said quill ends.

5. A shuttlecock comprising a substantially cup-shaped body formed of sponge rubber and having a recess formed therein, a plurality of feathers extending upwardly and outwardly from said body and having their quill ends extending downwardly and inwardly into and embedded in said body around the recess therein and means applied and permanently secured to the upper portion of the body around the recess therein for imparting and maintaining compression in that portion of the body in which the quills are embedded, stiffening means embedded in said body and engaging the downwardly and inwardly extending ends of said quills for resisting inward movement of said quill ends toward each other.

6. A shuttlecock, comprising a substantially hemispherical sponge rubber body, an axially disposed recess formed in the flat surface of said body, a plurality of feathers having their quill ends embedded in said flat surface around said recess, the tips of said quill ends extending into said body a substantial distance below the floor of said recess, and means in said body for stiffening that portion of the body in which said quill portions are embedded, the tips of said quill ends being secured to said means.

7. A shuttlecock comprising a substantially cup-shaped body formed of sponge rubber and having a recess formed therein, a plurality of feathers having their quill ends embedded in said body around the recess therein, and a stiffening member embedded in said body adjacent the inner end of said recess and engaged by said quill ends to resist inward or closing movement of said ends.

8. A shuttlecock comprising a substantially cup-shaped body formed of sponge rubber and having a recess formed therein, a plurality of feathers having their quill ends embedded in said body around the recess therein, said quill ends being inclined inwardly toward each other, and a stiffening member embedded in said body adjacent the inner end of said recess and engaged by said quill ends to resist inward or closing movement of said inclined ends.

9. A shuttlecock comprising a body of sponge rubber, said body having a rounded face and a flat face opposite its rounded face, a series of feathers having the quill ends of their quill portions embedded in said body and extending a substantial distance beyond said flat face and stiffening means incorporated in said body of less flexibility than sponge rubber engaged by the ends of said quill portions.

ATWOOD M. TIMPÉ.

REFERENCES CITED

The following references are of record in the file of this patent:

UNITED STATES PATENTS

| Number | Name | Date |
|---|---|---|
| 2,059,930 | Booth | Nov. 3, 1936 |
| 2,217,032 | Timpé | Oct. 8, 1940 |
| 2,359,726 | Booty | Oct. 3, 1944 |

FOREIGN PATENTS

| Number | Country | Date |
|---|---|---|
| 406,465 | Great Britain | Mar. 1, 1934 |